United States Patent [19]
Hancock et al.

[11] Patent Number: 5,319,793
[45] Date of Patent: Jun. 7, 1994

[54] METHOD AND APPARATUS FOR IMPROVED COMPRESSION AND RECORDING OF COLOR VIDEO DATA IN A PERSONAL COMPUTER USING A PLURALITY OF LOOKUP TABLES

[75] Inventors: Steven M. Hancock, Boca Raton; Mark A. Pietras, Boynton Beach, both of Fla.; Arturo A. Rodriguez, Belmont, Calif.

[73] Assignee: International Business Machines Corporation, Armonk, N.Y.

[21] Appl. No.: 964,675

[22] Filed: Oct. 21, 1992

[51] Int. Cl.$^5$ .................... G06F 13/00; G06F 3/00
[52] U.S. Cl. .................... 395/800; 395/152; 395/125
[58] Field of Search .............. 395/800, 152, 125; 358/11, 12, 13, 135, 209, 136; 382/56

[56] References Cited

U.S. PATENT DOCUMENTS

| | | | |
|---|---|---|---|
| 4,743,959 | 5/1988 | Frederiksen | 358/11 |
| 5,164,819 | 11/1992 | Music | 358/13 |
| 5,177,608 | 1/1993 | Ohki et al. | 358/136 |

*Primary Examiner*—Alyssa H. Bowler
*Assistant Examiner*—John Harrity
*Attorney, Agent, or Firm*—Bernard D. Bogdon

[57] ABSTRACT

A personal computer system is operated to concurrently execute threads of multitasking operations to capture motion video data from a video source, compress such data, and record the compressed data in a file. Compression is selectively done in either one of two modes, an inter-frame compression mode and a intra-frame compression mode, both modes being block-oriented. During intra-frame compression, homogenous blocks are used to represent four pixel values with a single pixel value when the four pixels in a block are perceptually similar. During inter-frame compression, unchanged blocks are used to represent four pixel values as unchanged from the preceding frame when the four pixels are perceptually similar to the same four pixels in the preceding frame. Additionally, inter-frame compressed video frames use homogenous blocks to represent four pixel values with a single pixel when the four pixel values in a block are perceptually similar to each other but are perceptually different from the same four pixels in the previous frame.

4 Claims, 7 Drawing Sheets

FIG. 3A
INTER-FRAME

FIG. 3B
INTRA-FRAME

METHOD AND APPARATUS FOR IMPROVED COMPRESSION AND RECORDING OF COLOR VIDEO DATA IN A PERSONAL COMPUTER USING A PLURALITY OF LOOKUP TABLES

BACKGROUND OF THE INVENTION

This invention relates to the field of data processing, and, more particularly to improvements in a personal computer system and method of operating the system to provide for the real time capture, compression, and recording of motion video.

Recording of digital motion video in real time without compression produces an excessively high data rate that exceeds the file I/O transfer capabilities of many personal computer systems. A high data rate produces large files that quickly exhaust disk storage thereby reducing the length of recordings that can be made with a given amount of disk storage. While real time compression of motion video during recording can be accomplished with compression assisted by specialized hardware, a software motion video compression algorithm that executes in real time in the main processor of a personal computer is required to make motion video recording practical when low-cost video capture devices, without hardware compression, are used.

Since the computational complexity of most software-only motion video compression algorithms is too great to execute in real time, motion video recording is often performed frame-by-frame, and the image data is compressed during the capture process. While this method generally produces high quality and compression, it has the disadvantage that recording requires costlier "frame stepping" source devices such as video disks which may also entail conversion of source media. This method of recording is time consuming and precludes capture from "live" sources such as video cameras.

Real time capture can be accomplished in a software only environment by capturing raw data and transferring it to disk, compressing it later in non- real time. One drawback to such approach is that capturing raw motion video data at an acceptable resolution and frame rate results in an excessively high data rate. For example, capturing a 160×120 image with 16-bits per pixel at 15 frames per second, results in a raw data capture rate of 576,000 bytes per second. This data rate exceeds the available disk file I/O rate of many commonly available personal computer systems. Furthermore, motion video capture is usually accompanied by a digital audio capture which further increases the data rate. Even in systems that can sustain the required data transfer rates, the volume of data that is produced limits the length of time that can be recorded. A 200 megabyte hard disk holds only about five minutes at 576,000 bytes per second. Another drawback is that second pass compression, which is generally acceptable for capturing recorded video data, does not work for live video capture/playback applications such as video conferencing.

Specialized digital video capture adapters with hardware support for compression solve these problems by enabling real time capture with compression. However, such adapters are relatively costly and have a smaller installed base that the more common video capture adapters that do not support specialized hardware-based compression.

SUMMARY OF THE INVENTION

One of the objects of the invention is to provide an improved real time motion video data capture, compression, and recording method and apparatus.

Another object of the invention is to provide a motion video compression algorithm that can be implemented in a personal computer using commercially available, low cost video capture adapters and without using or requiring any specialized compression hardware.

A further object of the invention is to provide a compression algorithm that uses both temporal and spatial compression techniques and produces varying levels of compression/quality by using different threshold values.

Still another object of the invention is to provide real time video motion data compression algorithm that produces compression ratios within the range of 2:1 to 4:1.

An other object of the invention is to provide a personal computer system that achieves a minimum compression ratio of 2:1 for real time motion video recording, by executing instructions, in a commercially available microprocessor conforming to the architecture of the well known Intel 80386 and 80486 microprocessors, in such a manner as to minimize instruction execution cycles and memory references.

Another object of the invention is to provide a common conversion routine for use with different native hardware color formats, and in which decisions as to homogeneity are made based on luminance/chromanance format color values.

A still further object of the invention is to provide a personal computer system which operates in a multitasking mode that concurrently captures, compresses, and records motion video data in a real time basis.

Briefly, in accordance with the invention, a personal computer system is operated to concurrently execute threads of multitasking operations to capture motion video data from a video source, compress such data, and record the compressed data in a file. Compression is selectively done in either one of two modes, an inter-frame compression mode and a intra-frame compression mode, both modes being block-oriented. During intra-frame compression, homogenous blocks are used to represent four pixel values with a single pixel value when the four pixels in a block are perceptually similar. During inter-frame compression, unchanged blocks are used to represent four pixel values as unchanged from the preceding frame when the four pixels are perceptually similar to the same four pixels in the preceding frame. Additionally, inter-frame compressed video frames use homogenous blocks to represent four pixel values with a single pixel when the four pixel values in a block are perceptually similar to each other but are perceptually different from the same four pixels in the previous frame.

DRAWINGS

Other objects and advantages of the invention will be apparent from the following description taken in connection with the accompanying drawings wherein.

DETAILED DESCRIPTION

Figure 1:
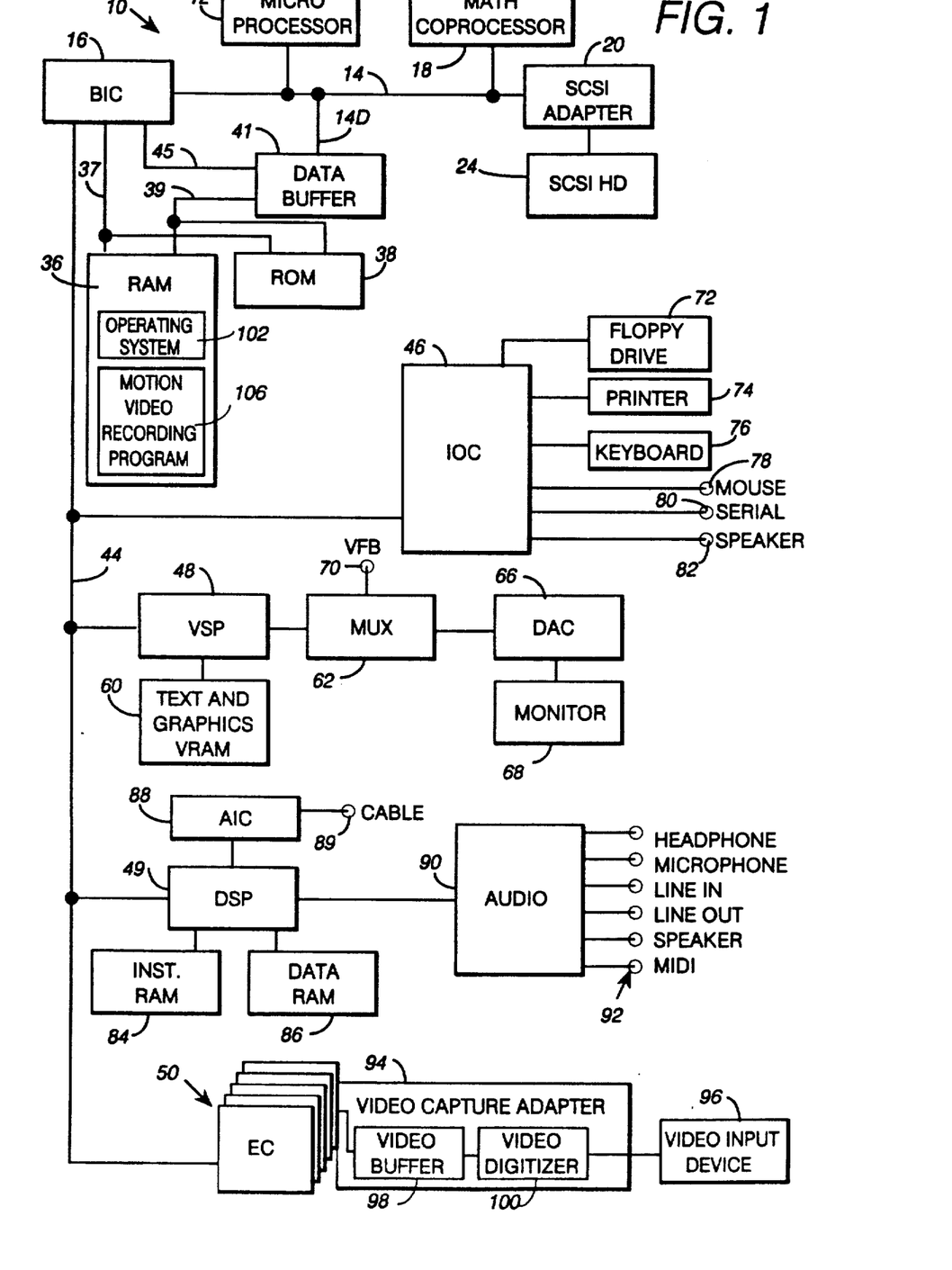
FIG. 1 is a block diagram of a personal computer system embodying the invention.

Referring now to the drawings, and first to FIG. 1, there is shown an exemplary multimedia data processing system (DPS) comprising a personal computer 10 operable under a multitasking operating system such as OS/2 Version 2.0, to execute application programs. Computer 10 comprises a microprocessor 12 connected to a local bus 14 which, in turn, is connected to a bus interface controller (BIC) 16, a math coprocessor 18, and a small computer system interface (SCSI) adapter 20. Microprocessor 12 is preferably one of the family of 80 xxx microprocessors, such as an 80386 or a 80486 microprocessor, and local bus 14 includes conventional data, address, and control lines conforming to the architecture of such processor. Adapter 20 is also connected to a SCSI hard drive (HD) 24 which functions, among other functions, to store files of data compressed in accordance with the invention as described in more detail below.

BIC 16 performs two primary functions, one being that of a memory controller for accessing a random access memory (RAM) 36 and a read only memory (ROM) 38. RAM 36 is a dynamic random access memory that functions as the main memory for storing data and programs for execution by microprocessor 12 and math coprocessor 18. An address and control bus 37 connects BIC 16 with memory 36 and ROM 38. A data bus 39 connects memory 36 and ROM 38 with a data buffer 41 that is further connected to data bus 14D of bus 14. Control lines 45 interconnect BIC 16 and data buffer 41.

The other primary function of BIC 16 is to interface between bus 14 and an expansion bus 44 designed in conformance with Micro Channel (MC) architecture. Bus 44 is further connected to an input/output controller (IOC) 46, a video signal processor (VSP) 48, a digital signal processor (DSP) 49, and a plurality of expansion connectors (EC) or slots 50. VSP 48 is further connected to a video RAM (VRAM) 60 and a multiplexor (MUX) 62. VRAM 60 stores text and graphic information for controlling what appears on the screen of a monitor 68. MUX 62 is further connected to a digital to analog converter (DAC) 68 and to a connector or terminal 70 that is connectable to a video feature bus (VFB). DAC 66 is connected to monitor 68 that provides a conventional output screen or display for viewing by a user.

IOC 46 controls operation of plurality of I/O devices including a floppy disk drive 72, a printer 74, and a keyboard 76. Drive 72 comprises a controller (not shown) and a removable floppy disc or diskette 73. IOC 46 also is connected to a mouse connector 78, a serial port connector 80, and a speaker connector 82 which allow various optional devices to be connected into the system.

DSP 49 is further connected to an instruction RAM 84, a data RAM 96, an analog interface controller (AIC) 88, and an audio controller (90). RAMs 84 and 86 respectively hold instructions and data used by DSP 49 for processing signals. Audio controller 90 controls various audio inputs and outputs and is connected to a plurality of connectors 92 by which various devices can be connected to the system. Such devices include a headphone, a microphone, a speaker, a musical instrument digitizing interface (MIDI), and devices requiring an audio line-in and line-out functions.

Memory 36 stores various programs for execution in the system, which programs include an operating system (OS) 102 and a motion video recording program (MVRP) 104. Program 104 is an application program that runs under the operating system and has various threads, discussed below, which are concurrently executed as multitasks to provide real time motion video recording of data from a video input device 96 such as a video camera. Device 96 is connected to a video digitizer 100 in a video capture adapter 94. A video buffer 98 is also included in adapter 94 and is connected to receive uncompressed motion video data from digitizer 100. Adapter 94 is connected through an expansion connector 50 to bus 44 and the rest of the system allowing the adapter and video input device to be operated under the control of motion video recording program 104.

Figure 2:
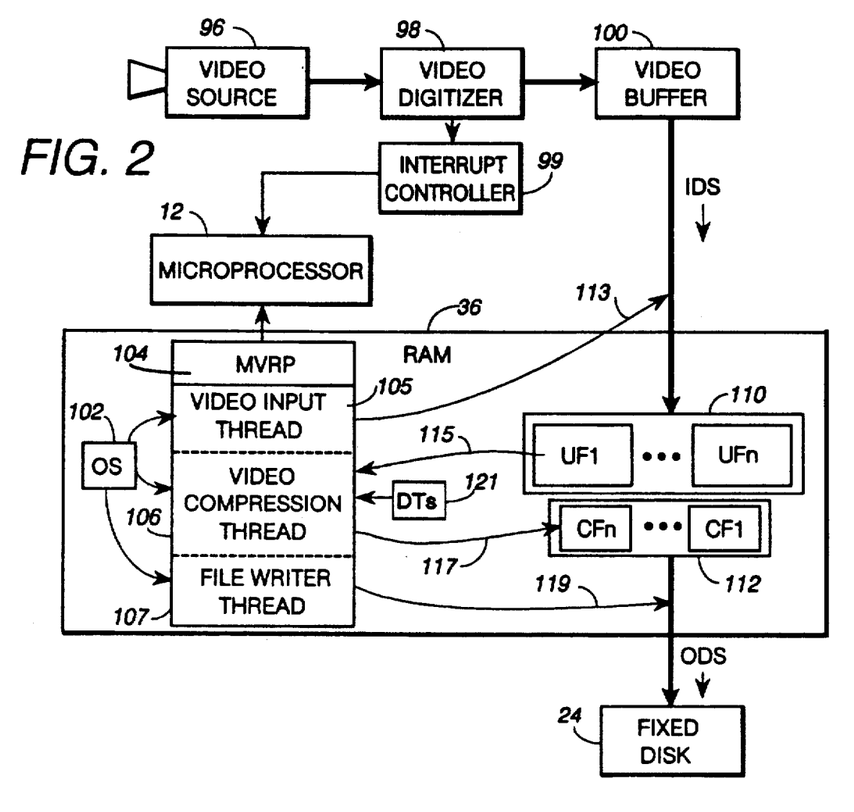
FIG. 2 is a schematic diagram illustrating the primary data flow for capturing, compressing, and recording motion video data in the system shown in FIG. 1.

The general operation of the system, while MVRP 104 is being executed, is schematically shown in FIG. 2, to which reference will now be made. The flow of data occurs along the thicker lines in this figure and starts with analog data from video source 96, which is transmitted into digitizer 98. Digitizer 98 converts the analog input into pages or frames of digitized data and transmits the frames into video buffer 100. Each frame comprises a number of pixel values corresponding to the number of pixels used to capture the momentary "picture" or image seen by the video source. Each digitized pixel value contains 16-bits (two bytes) of information represented in the well known RGB16 (red-blue-green sixteen bit) format of five bits for the red value, six bits for the blue value, and five bits for the green value. The frames in video buffer 100 are uncompressed and are transmitted in an input data stream (IDS) as uncompressed frames UF having a sequence of pixel values PV1-PVn (where "n" corresponds to the number of pixels per screen image) into a data input buffer 110 in RAM 36 to form a first-in, first-out (FIFO) queue of uncompressed frames UF1-UFn. After each frame has been processed and compressed, it is placed in an output buffer 112 of RAM 36 as a FIFO queue of compressed frames CF1-CFn from where the frames are sequentially transmitted in an output data stream (ODS) and recorded in a file on fixed disk 24. The files can be later uncompressed or expanded, following a reverse of the compression process, and transmitted to a viewing device, such as a monitor, for viewing the motion video thus recorded.

The general operation described in the preceding paragraph is under the control of microprocessor 12. When digitizer 98 converts enough samples of the analog input to complete a frame, it sends an interrupt signal to interrupt controller 99 which in turn transmits an interrupt request to microprocessor 12 causing an interrupt handler to produce a signal allowing a video input thread 105 to copy the completed frame to queue 110. Thread 104 may also provide scaling of the data. Thread 104 is part of MVRP 104 which operates under the control of OS 102 along with a video compression thread 105 and a file writer thread 107, on a multitasking basis. These threads create a data stream in which raw digitized motion video data is inputted in the IDS from buffer 100 into RAM 36, compressed by video compression thread 106 in the manner described in detail below, and written to a file in disk 24 by file writer 107 on a real time basis. In a conventional way of multitasking, each of the threads is sequentially alloted a separate execution time by OS 102 so as to impart a perception to a user that all three threads are being executed simultaneously when in fact the microprocessor executes only one thread at a time. Video input thread 105 controls the filling of input buffer 110 with frames of digitized data from video buffer 100. Video compression thread 106 processes frames from buffer 110 one-at-a-time, compresses data therein as described below, and writes compressed frames to buffer 112. During the course of such processing, thread 106 accesses information in various data tables (DTs) 121 stored in RAM 36. File writer thread 107 writes or records the frames from buffer 112 in hard disk 24. The control over such functions is represented in FIG. 2 by the respective lines 113, 115, 117, and 119.

The operation of video compression thread 106 is selectively done for individual frames in either one of two modes, an inter-frame mode or an intra-frame mode. The inter-frame mode produces delta-frames and the intra-frame mode produces I-frames. An I-frame contains in itself all the information necessary to produce an image. A delta-frame, on the other hand, contains differences relative to previous frames and thus depends on and needs information in one or more previous frames to produce an image. When successive images are not changing rapidly, the inter-frame mode is advantageous because the delta-frames can be compressed to greater degree than I-frames. The first frame of an ODS needs to be an I-frame but the remaining frames can be all delta-frames or a mixture of delta-frames and I-frames. A mixture may be used when the resultant file is to be played back with a fast forward feature. In such a case, I-frames can be inserted periodically, e.g., every second or every thirtieth frame, so that the maximum time to produce a complete image when fast forwarding occurs, is relatively short.

Figure 3A:
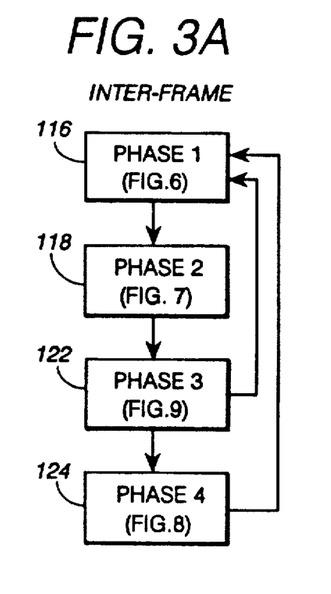
FIGS. 3(a) and (b) are schematic diagrams illustrating phases of operation of the invention for preselected modes of operation.
Figure 3B:
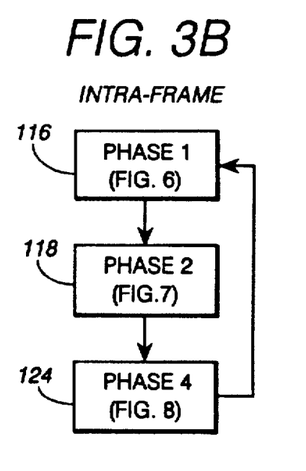

Referring to FIGS. 3A and 3B, when operating in an inter-frame mode, four phases are used, and when operating in an intra-frame mode, three phases (illustrated in section (B)) are used. In both modes, the operation begins with Phase 1, described below with reference to FIG. 6, and then with Phase 2, described below with reference to FIG. 7. Then, in the inter-frame mode, Phase 3 follows Phase 2 and completes by branching to Phase 4 or to Phase 1, in the manner described below with reference to FIG. 9. In the intra-frame mode, Phase 4 follows Phase 2. Phase 4 is described below with reference to FIG. 8. In both modes, Phase 4 completes by branching back to Phase 1. The four phases are also designated respectively by numerals 116, 118, 122, and 124, int he drawings.

Figure 4A:
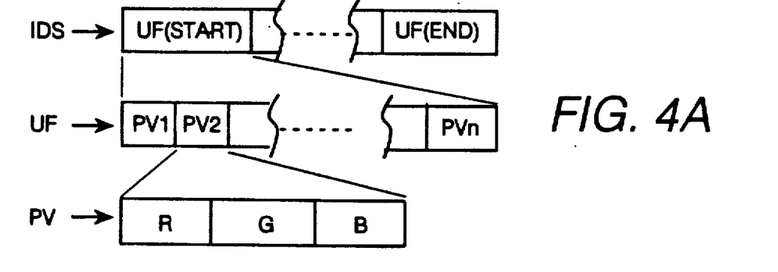
FIGS. 4(a)-(d) are diagrams illustrating various data structures used for the compression of data in accordance with the invention.

Various data structures are shown in sections (A)–(D) of FIGS. 4A–4D. Referring to FIG. 4A, the input data stream (IDS) comprises a plurality of uncompressed frames (UFs) created from the start to the end of image creation by source 96 and digitizer 98. Each UF contains a plurality of "n" pixel values (PVs) corresponding in number to the number "n" of pixels in a screen image. Each PV contains two bytes (sixteen bits) of color information in an RGB format, with 5-bits for level of red intensity, 6-bits for level of green intensity, and 5-bits for level of blue intensity.

Figure 4B:
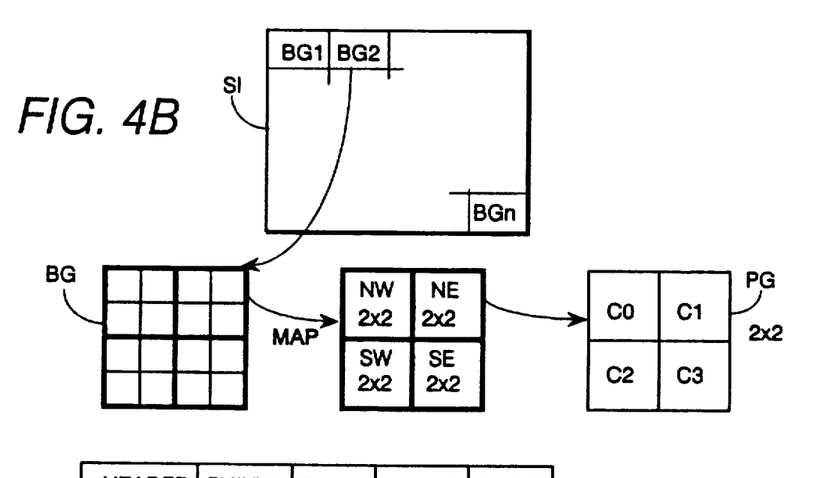

As shown in FIG. 4B, for compression processing, a screen image (SI) is divided into non-overlapping block groups (BGs) with each BG containing four 2×2 pixel groups (PGs) of pixel values respectively designated C0–C3. The four PGs in a BG may be logically mapped or considered as quadrants of the BG, there being a northwest (NW) quadrant, a northeast (NE) quadrant, a southwest (SW) quadrant, and a southeast (SE) quadrant. Each BG thus represents the pixel values of sixteen adjacent pixels in the screen image.

Figure 4C:
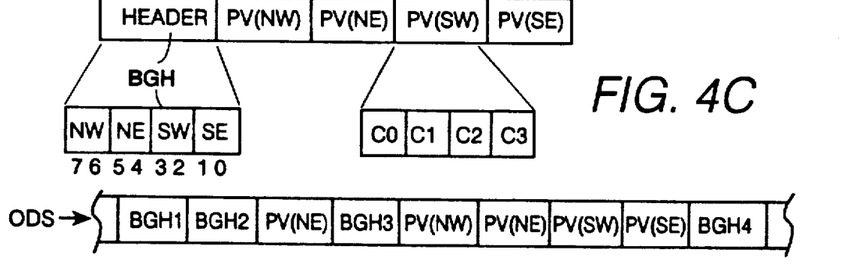

The output data stream (ODS) flows from output buffer 112 to disk 24 and comprises a plurality of compressed frames (CFs) which vary in size dependent on the specific compression that takes place during processing. The number of CFs is the same as the number of UFs, there being a one-to-one correspondence between the two sets of frames. Each CF comprises a plurality of block group headers (BGHs) corresponding to the number of BGs in a screen image SI. As shown in FIG. 4C, each BGH is one byte and has eight bits logically separated into four fields of two bits. Each field corresponds to a different one of the group block quadrants NW, NE, SW, and SE. Each two bit field defines the data for the corresponding 2×2 pixel block or quadrant, as follows:

00: 2×2 block unchanged, no succeeding pixel values for block b 01: 2×2 block is changed homogenous, one succeeding pixel value for block.

10: 2×2 block is changed, not homogenous, four succeeding pixel values for block.

11: (no meaning)

In an inter-frame ODS, each preceding BGH is followed either by an immediately succeeding header or from one to sixteen pixel values from one or more of the quadrants. The number of pixel values following a header is dependent upon results of the compression processing as described below and is in accordance with the information in the header. Thus, each header may be followed by 0, 1, or 4 PVs for the NW quadrant, 0, 1, or 4 PVs for the NE quadrant, 0, 1, or 4 PVs for the SW quadrant, and 0, 1, or 4 PVs for the SE quadrant. An exemplary inter-frame ODS is shown in (C) as containing the series of: BGH1; BGH2; one entry for PV(NE); BGH3; four entries for each of PV(NW), PV(NE), P(SW), PV(SE); and BGH4. In such series, there is no change in BG1 since there are no PVs following BGH1. For BG2, a homogenous change occurs in the NE quadrant. For BG3, not homogenous changes occur in each of the quadrants. Obviously, differing images and changes therein produce different series. An uncompressed block group contains sixteen, two byte color values, or a total of thirty two bytes. When compressed, the block group contains a one-byte BGH and from 0-to-16 color values and thus varies in size from 1-to-33 bytes. The advantage of the invention is that during the course of recording a motion image, each frame contains a relatively large number of homogenous blocks that do not change from frame to frame. For example, with many images, most of the background remains the same and only the motion associated with an object of interest, changes.

Figure 4D:
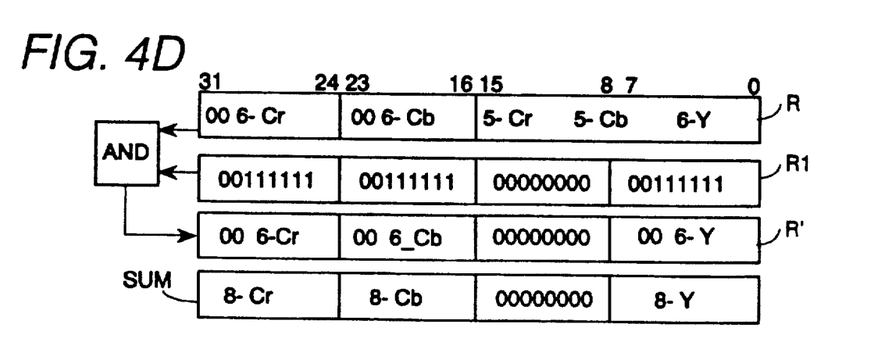

FIG. 4D shows a 32-bit YCrCb value, obtained from table 252 (FIG. 5) and loaded into a register R. The YCrCb value contains two words. The high order word has two bytes which contains 6-bit Cr and Cb values.

The low order word contains a 5-bit Cr value, a 5-bit Cb value, and a 6-bit Y value, which word represents a standard YUV_16 format.. The contents of register R are logically ANDed with mask bits shown in register R1, to produce the results in register R'. The ANDing thus zeroes bits 15-6 and removes the low word chromanance values leaving only 6-bit values of YCrCb in register R'. Four such results are accumulated in SUM to produce 8-bit totals of Cr, Cb, and Y from which the averages can be readily calculated.

Figure 5:
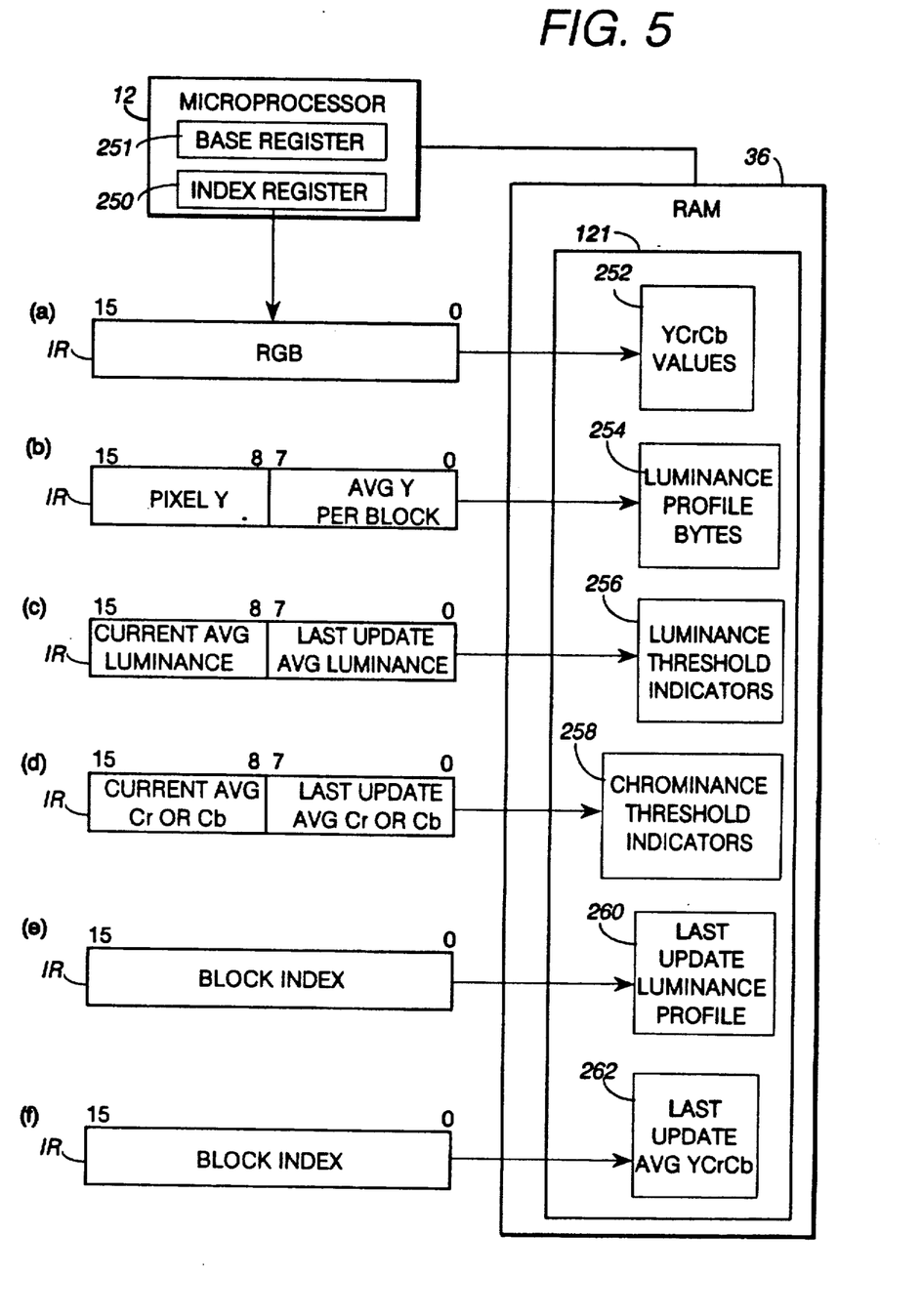
FIG. 5 is a schematic block diagram illustrating data tables and how they are accessed.

Referring to FIG. 5, the tables 121 stored in RAM 36 include a table 252 of 32-bit YCrCb values, a table 254 of luminance profile values, two tables 256 and 258 of threshold indicators, a buffer 260 of last update luminance profiles, and a buffer 262 of last update AVG YCrCb values. Microprocessor 12 has a plurality of local registers including local registers 250 and 251. Register 251 is used as a base register into which the base address of a table can be loaded. Register 250 is used as an index register (IR) that is loadable with different indices or offsets for accessing all of the tables in 121. The combination of the base address from 251 and the offset from 250 is used to selectively access entries in the tables. The various settings of the IR shown at (a)-(f) access the tables in the following manner. The RGB value of the raw data accesses table 252. Table 254 is accessed by placing the AVG Y per block value in the low byte and a pixel luminance value Y in the high byte. Table 256 is accessed by placing the last update AVG luminance value in the low byte, and the current AVG luminance in the high byte. Tables 260 and 262 are accessed by placing a block number index in the IR.

Table 252 stores color values represented in luminance, chromanance (L/C) format YCrCb, where Y is the luminance value, and Cr and Cb are red and blue chromanance values. For RGB16 colors, the values of Y, Cr, and Cb stored in table 252, are calculated as follows:

$$Y = 0.299R + 0.29356 + 0.14B$$

$$Cr = 16 + 0.713(R - Y)$$

$$Cb = 16 + 0.564(B - Y)$$

where R is from 0 to 31, G is from 0 to 63, and B is from 0 to 31 dependent upon the values of their respective bits. The YCrCb values can be converted in the reverse direction in accordance with the following formulas:

$$R = Y + 1.403(Cr - 16)$$

$$G = 2Y - 1.43(Cr - 16) - 0.688(Cb - 16)$$

$$B = Y + 1.773(Cb - 16)$$

Table 254 contains 64K luminance profile bytes. Each byte is of the following format:
Bits 7-3: 0 (not used)
Bit 2: contrast bit- Set to 1 if (pixel Y — AVG Y) > contrast threshold, otherwise set to 0.
Bit 1: contrast bit- Set to 1 if (AVG y — pixel Y) > contrast threshold, otherwise set to 0.
Bit 0: not-homogenous bit- Set to 1 if (pixel Y — AVG y) > homogenous threshold, otherwise set to 0.

A 32-bit block luminance profile is created using table 254 by performing four table look-ups, one for each pixel in a block. The use of the "not-homogenous" bit (conversely, the "homogenous" bit) should be fairly obvious. The homogeneity of a block is tested primarily by the luminance levels of each pixel value, and if the levels are all approximately the same, the block is considered homogenous. Thus a threshold level is used, which if exceeded, produces a perception that the block is not homogenous. The smaller the threshold, the more uniform each pixel would appear. A threshold of "3" would be an exemplary value. The use of the contrast bits is not so obvious. Such bits are used in the interframe mode for the situation where even though the current average block luminance level is about the same as the last update average luminance and within the threshold of the last update average luminance level for the block, the individual pixel luminance values differ greatly so that the two blocks (current block and last update block) would have different appearances.

For example, suppose that an extreme exists in which black and white pixels alternate. Such a block would appear different or changed from a block in which the four pixels values are all around 32. The white pixels have a luminance of 64 while the black pixels have a luminance of "0". Their block average is 32. The contrast threshold should be set at a higher level, e.g. "10" than the luminance threshold level. With such an example, contrast bit 2 is set if the pixel luminance is much greater than the block average luminance and thus would be set to a "1" for each white pixel. Contrast bit 1 is set if the pixel luminance level is much less than the average block luminance level and thus would be a "1" for each black pixel.

Blocks 256 and 258 are each 64K- 1-bit blocks for luminance and chromanance threshold indicators the entries of which are set to 1 if the current average luminance or chromanance (high order index byte) exceeds the last update average luminance or chromanance (low order index byte) by a threshold amount and are set to 0 if a threshold amount is not exceeded. Blocks 260 and 262 respectively contain a plurality of luminance profile and AVG YCrCb entries corresponding to the number of blocks in a frame. Such entries are stored each time a pixel change occurs. A given entry may thus represent the value in the immediately preceding frame or what the value was, e.g., one hundred frames ago.

The use of the look-up tables speeds up processing compared to having to calculate values on-the-fly and make comparisons and decisions. It should also be obvious that the three tables 254, 256, and 258 can be combined into a single table to eliminate two of the unused bits in table 254. In such case, the resultant table would be accessed using different indexes dependent upon what type of value is being read.

Figure 6:
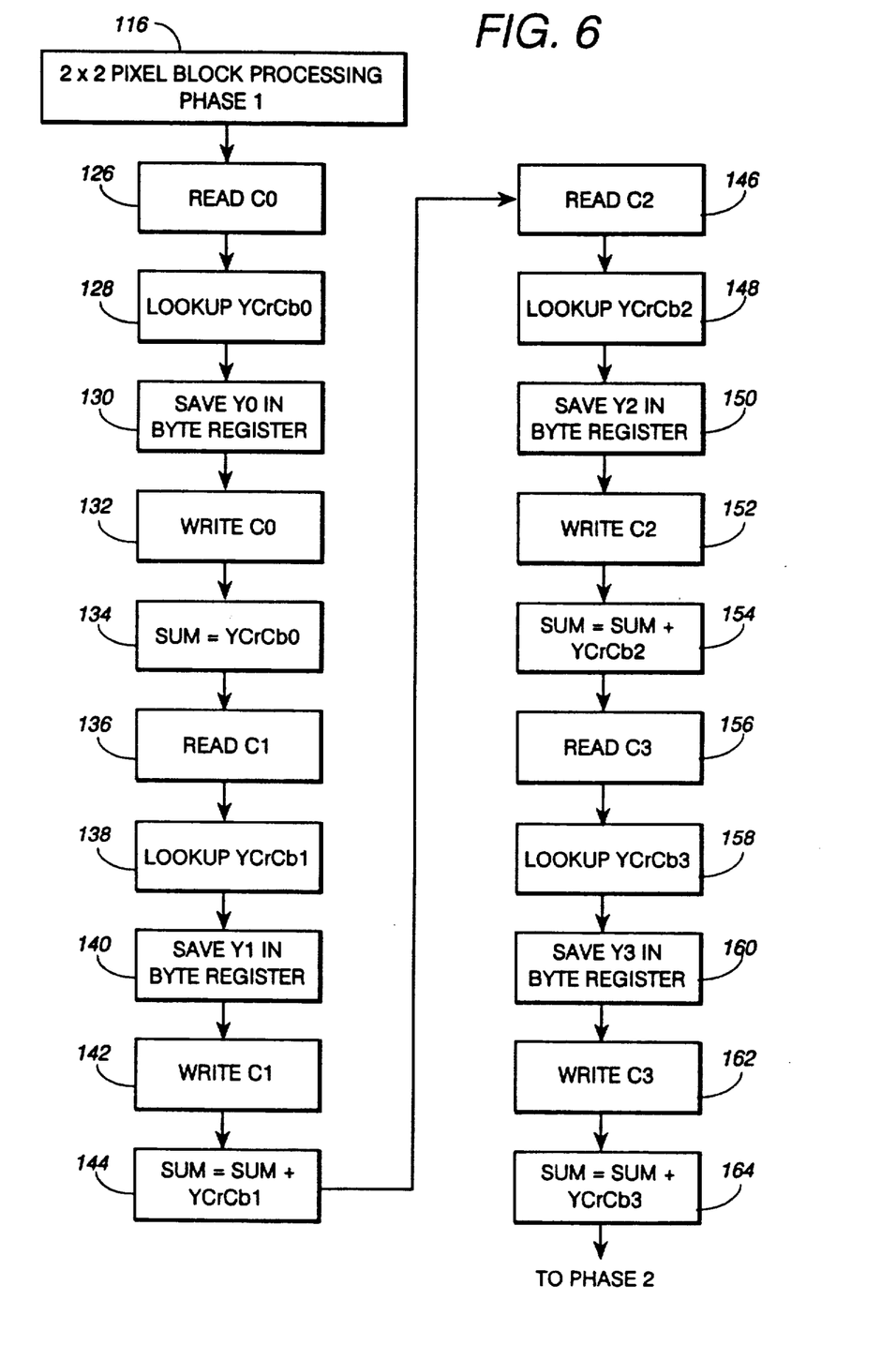
FIGS. 6-9 are flow charts of different operating phases of the invention.
Figure 7:
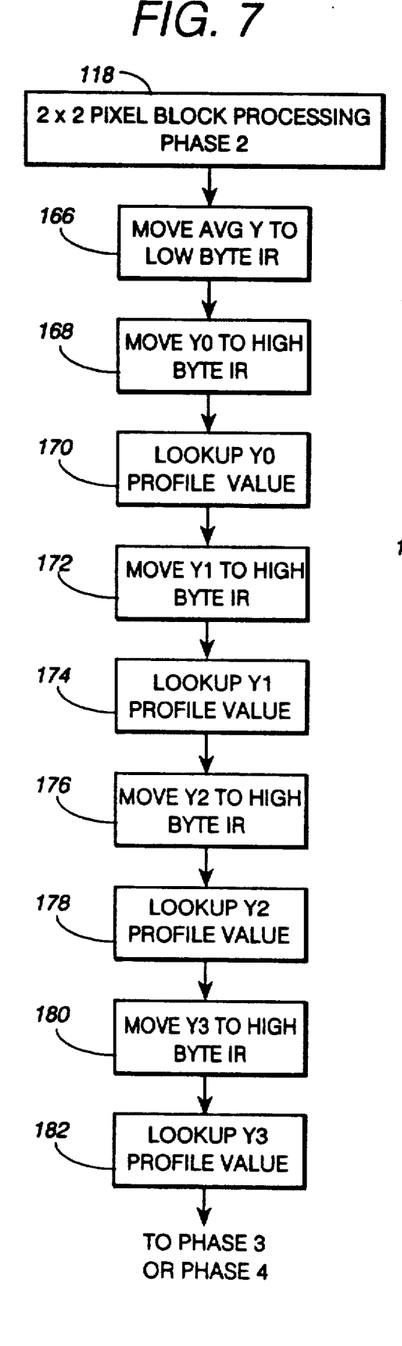

Referring to FIG. 6, motion video data compression is accomplished by processing the 2×2 pixel groups PGs or blocks one-block-at-a-time. As indicated above, each PG or block contains four pixel values respectively designated C0, C1, C2, and C3 each of which contains two bytes representing the RGB color value of a pixel. These RGB input values into the conversion process, are considered to be in a "native hardware format". For each 2×2 block, the first step 126 in Phase 1 is to read the RGB pixel value C0 into the IR register for processing. Step 128 then combines such value with the base address of table 252 (FIG. 5) to look-up the corresponding L/C value YCrCb0 in table 121. Step 130 then saves the luminance portion Y0 in a register. Step 132 then writes the color value C0 to the output data stream, and step 134 accumulates the YCrCb values in a variable named "SUM" (FIG. 4(D)). Similar steps 136-144, 1436-154, and 156-164 are performed for each of the remaining pixel values C1, C2, and C3, with the result at the end of Phase 1 that for each pixel in the block being processed, a luminance value Y has been stored, an L/C value YCrCb has been accumulated, and four pixel value C0-C3 have been written to the output data stream. Alternatively, instead of outputting RGB values, the LUV format from the low order word of the YCrCb look-ups obtained in steps 128, 138, 148, and 158, can be outputted.

Phase 2 immediately follows Phase 1 and begins with step 168 (FIG. 7) which first calculates the average pixel luminance value AVG Y from the accumulated luminance value in SUM, and places the AVG Y value in the low byte of register 250 (the IR). Step 168 then moves Y0 into the high byte of such register. Step 170 looks up the Y0 luminance profile bytes in table 254 and stores it in the first field of the 32-bit block luminance profile. Similar steps 172 and 174, 176 and 178, and 180 and 182 are performed for Y1, Y2, and Y3 with the result that at the end of these steps, the block luminance contains four luminance profile bytes, one for each of the pixels in the 2×2 PG being processed. Following step 182, phase 3 or phase 4 is entered depending upon which mode is being done, as previously indicated.

Figure 9:
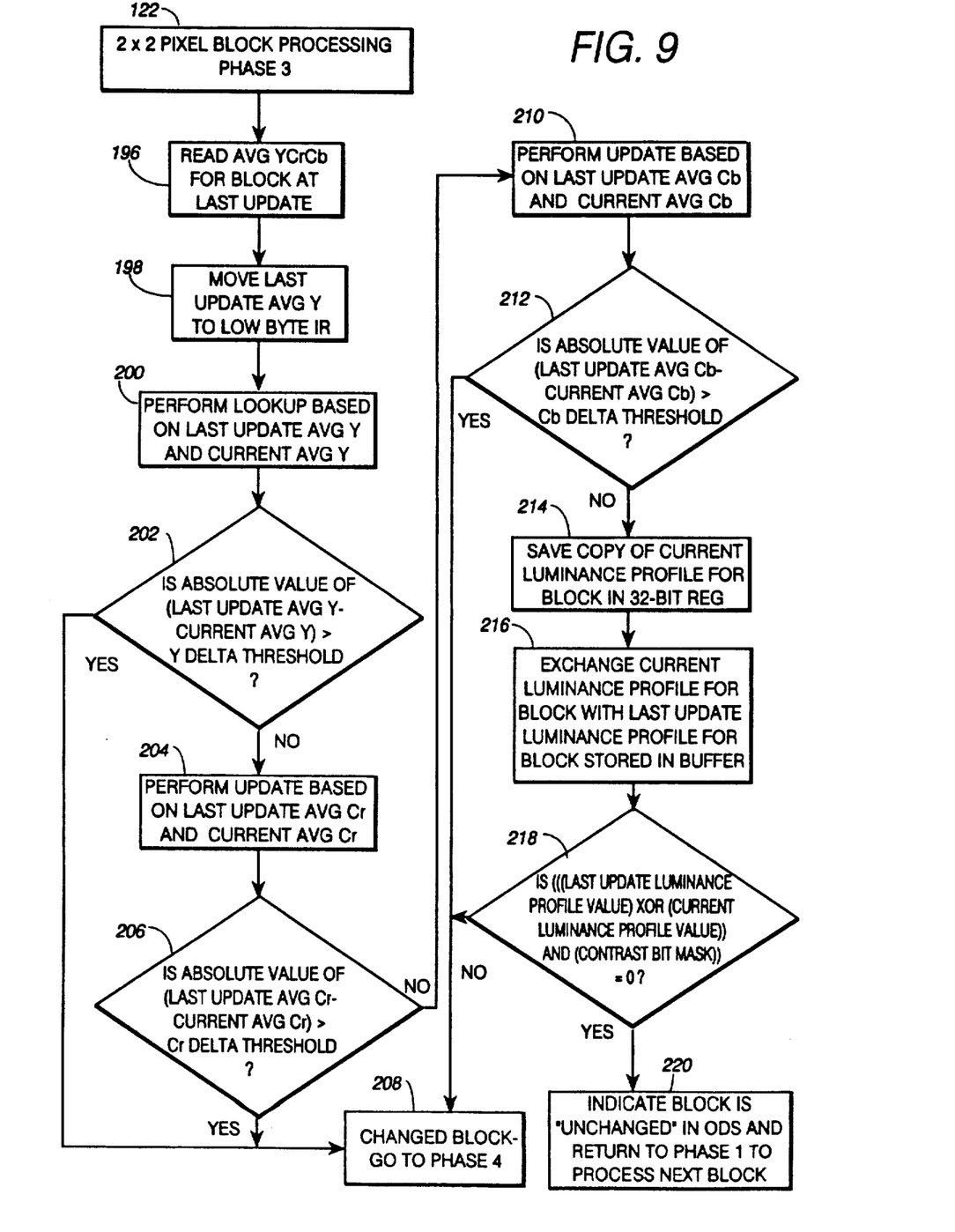

Referring to FIG. 9, if inter-frame (delta frame) processing is being done, Phase 3 immediately follows Phase 2 and begins with step 196 which reads from table 262 the last update average YCrCb for the block. Step 198 extracts and moves the last update AVG Y from such average YCrCb and places it in the low byte of IR. Step 200 then performs a lookup into table 256 for the Y threshold indicator based on the last update AVG Y and the current AVG Y. Step 202 then makes a decision as to whether or not the absolute value of the (last update AVG Y minus the current AVG Y) is greater than a Y delta threshold. Such decision is made by examining the threshold indicator. If step 202 results in a positive (yes) determination, it means that the average luminance value of the block is changed from the last update and processing proceeds in step 208 with Phase 4. If step 202 results in a negative determination (no), meaning the block is not changed since the last update thereof, step 204 is executed and it performs a lookup by reading the Cr threshold indicator from table 258 based on the last update AVG Cr and current AVG Cr. Step 206 then looks at the Cr threshold indicator and decides if the absolute value of the (last update AVG Cr minus the current AVG Cr) is greater than a Cr delta threshold. If step 206 results in a positive (yes) determination, it means that the average Cr value for the block is changed from the last update, and processing proceeds in step 208 with Phase 4. If step 206 results in a negative determination (no), meaning the average Cr of the block is not changed from the last update, step 210 is executed and it performs a similar process for the Cb update based on the last update AVG Cb and current AVG Cb.

Step 212 then looks at the Cb threshold indicator and decides if the absolute value of the (last update AVG Cb minus the current AVG Cb) is greater than a Cb delta threshold. If step 212 results in a positive (yes) determination, it means that the average Cb of the block is changed from the last update and processing proceeds in step 208 with Phase 4. If step 212 results in a negative determination (no), meaning the block is not changed from the last update, step 214 then saves a copy of the current luminance profile for the block in a 32-bit register, and step 218 exchanges the current luminance profile for the block with the last update luminance profile for the block, in the buffer. Step 218 then performs the logical functions of exclusive ORing (XOR) the last update luminance profile value with the current luminance profile value and ANDing the result with a contrast bit mask and determines if the result is equal to zero. If 218 results in a negative determination, it means that the contrast bits of the luminance profile for the block are not identical to the values of the contrast bits of the luminance profile for the block the last time the block was updated, and processing proceeds in step 208 with Phase 4. If step 218 results in a positive determination, meaning the contrast bits are identical, the result means the block is unchanged since the last update. Step 220 sets the block bits in BGH to "00" to indicate the block is unchanged and then, without advancing an output stream pointer over colors written for this block, loops back to the beginning of Phase 1 to process the next block. Thus, no pixel values are outputted for such block.

Figure 8:
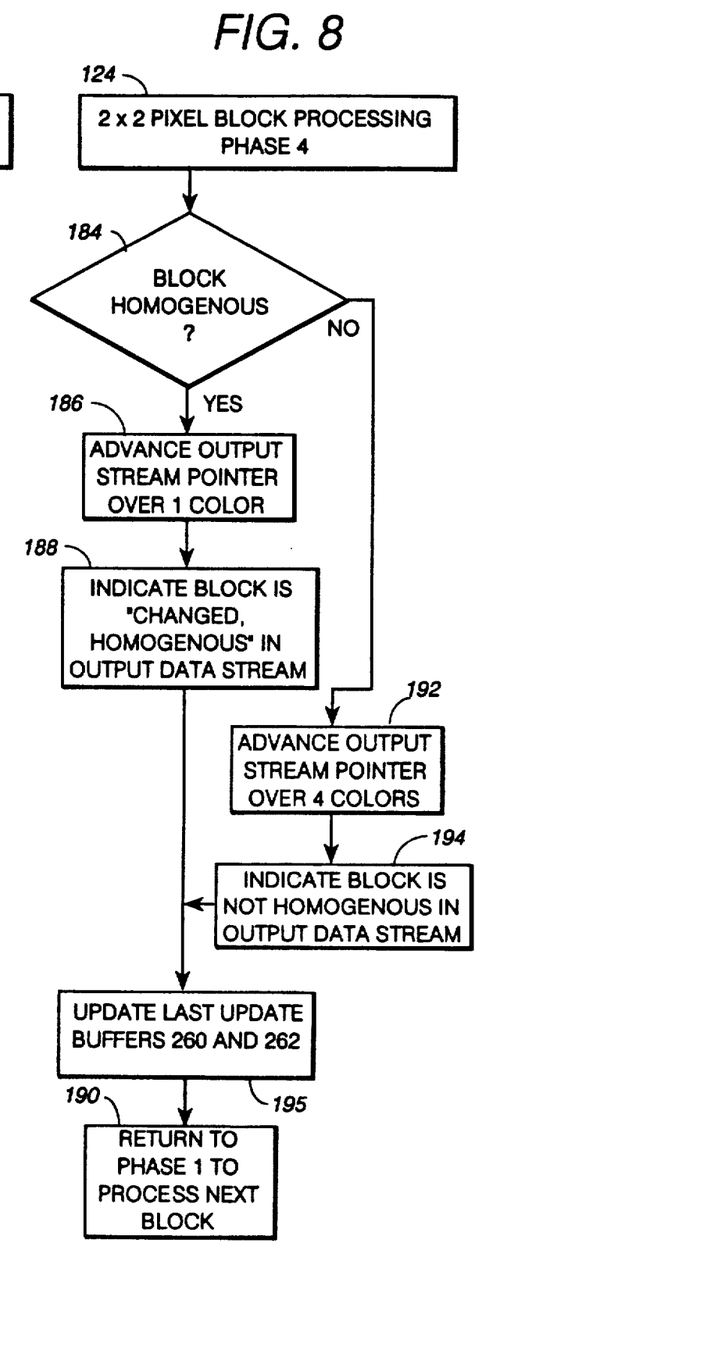

Referring to FIG. 8, the first step 184 of Phase 4 decides if the block currently being processed is homogenous or not. This is done by analyzing the current luminance profile for the block to see if any "not homogenous" bit is set. If no not-homogenous bit is set, meaning the block is homogenous, step 186 then advances the output stream pointer over one color and step 188 indicates in the output data stream BGH that the block is "changed,homogenous". Then a return is made in step 190 to the beginning of Phase 1 to process the next block. If step 184 detects at least one not-homogenous bit is set and produces a negative determination, meaning the block is not homogenous, step 192 advances the output stream pointer over four colors, instead of only one color as was done in step 186. Then, step 194 indicates in the BGH in the output data stream that the block is "changed, not homogenous" and step 195 updates the last update buffers 260 and 262 with the current values. Step 190 returns to Phase 1. The output stream pointer is set up in the EDI register of the microprocessor and indicates the point at which values are written into the output stream. It is to be recalled that during Phase 1, four colors C0-C3 were outputted, and when the output stream pointer advances over only one color, the remaining three colors are over written with pixel values from the next block. When the pointer is advanced over four colors, none of the four colors are over written and thus such pixel values are placed in the output data stream.

The various threshold values are adjustable (by using different values) to obtain the degree of compression/quality desired by a user. Increasing the threshold values results in greater compression, but reduces resolution and quality of resultant images. It should be apparent to those skilled in the art that many changes can be made in the details and arrangements of steps and parts without departing from the scope of the invention as defined in the appended claims.

What is claimed is:

1. A method of operating a personal computer system having a main memory for storing data and programs including a multitasking operating system, a general purpose microprocessor for executing programs stored in said main memory, a source of uncompressed frames of motion video data comprising a series of digitized pixel values, and an output device for recording compressed frames, wherein said method comprises the steps of:

(a) storing, in said main memory, a plurality of lookup tables for use in analyzing pixel color values expressed in a luminance-chrominance format YCrCb (where Y is a value representing luminance of a pixel color, Cr is a value representing red chrominance of a pixel color, Cb is a value representing blue chrominance of a pixel color), said tables including (a1) a first lookup table containing a plurality of pixel luminance profiles stored at locations accessible by a first index containing a Y value concatenated with an AVG_Y value wherein AVG_Y is an average of Y values in a block, each luminance profile containing a homogenous bit that is set to a not-homogenous state when (Y−AVG_Y) exceeds a predetermined homogenous threshold and is set to a homogenous state when (Y−AVG_Y) is equal to or less than said homogenous threshold, (a2) a second lookup table containing a plurality of threshold indicators stored at locations accessible by an index including a current AVG_YCrCb value concatenated with an AVG_YCrCb_AT_LAST_UPDATE value for a block, each threshold indicator being set to a first state when (AVG YCrCb−AVG_YCrCb_AT_LAST_UPDATE) exceeds a predetermined threshold and to a second state when (AVG_YCrCb−AVG_YCrCb_AT_LAST_UPDATE) does not exceed such threshold, and (a3) a third table containing a plurality of AVG_YCrCb_AT_LAST_UPDATE values stored at locations accessible by a third index including a block number identifying location of a block in a frame, each AVG_Y_AT_LAST_UPDATE value being a AVG_Y value when a block was last changed;

(b) storing an uncompressed frame from said source in said main memory, said uncompressed frame having a predetermined number of groups of blocks of pixel values, each group containing a predetermined number of blocks, each block containing a predetermined number of pixel values;

(c) defining each pixel values by a YCrCb value;

(d) operating said microprocessor to process a group, one block at a time and create an output entry for a group being processed, wherein said output entry comprises a header for a group being processed, said header having a plurality of bit fields for each block in said group being processed which bit fields indicate block status as being unchanged, changed-homogenous, and changed-not-homogenous, by steps comprising (d1) determining average YCrCb values AVG Y, AVG Cr and AVG Cb from all pixel values in a block, (d2) creating a block luminance profile by reading from said first lookup table a plurality of pixel luminance profiles for each pixel in a block, each pixel luminance profile being read using a first index comprising Y for such pixel and AVG Y of its block, (d3) reading from said third lookup table an AVG_YCrCb_AT_LAST_UPDATE value for said block being processed, (d4) reading a threshold indicator from said second lookup table using a second index of said AVG_YCrCb_AT_LAST_UPDATE value from step (d3) concatenated with current AVG_YCrCb for said block being processed, (d5) examining, when said threshold indicator read in step (d4) is in said second state thereof, whether any pixel luminance profile in said block luminance profile is set to a not-homogeneous state, and placing a plurality of pixel color values in said output entry when a pixel luminance profile is set to a not-homogenous state or placing a single pixel color value when all of said pixel profile values are set to homogenous states;

(d6) setting said block group header to indicate said block being processed has a homogenous status or a not-homogenous status in accordance with results of (d5), (d7) updating said third table wit current AVG_YCrCb and returning to step (d1) to process a next block, (d8) when said threshold indicator read in step (d4) is in said first state thereof, setting said block group header to indicate said block being processed has an unchanged status, and returning to step (d1) to process a next block, and (d9) transmitting to said recording means a single pixel color value for a homogenous block and a plurality of pixel color values for a not-homogenous block; and (e) transmitting output entries from said groups in a frame to said recording device for recording said output entries as a compressed frame.

2. A method of operating a personal computer system in accordance with claim 1 comprising:

storing contrast bits in each of said pixel luminance profiles in said first lookup table, said contrast bits in each pixel luminance profile indicating if (Y−AVG_Y) exceeds a predetermined contrast threshold;

storing in said main memory a fourth lookup table which contains contrast bits for pixels in a block at the last update thereof;

and, immediately after step (d4), reading from said fourth lookup table said contrast bits at last update, comparing such contrast bits with contrast bits in said luminance profiles from step (d2), and performing step (d5) when said comparison indicates inequality, and branching to step (d8) when said comparison indicates equality.

3. A personal computer system having a main memory for storing data and programs including a multitasking operating system, a general purpose microprocessor for executing programs stored in said main memory, a source of uncompressed frames of motion video data comprising a series of digitized pixel values, and an output device for recording compressed frames, said personal computer system comprising:

(a) a plurality of lookup tables stored in said main memory for use in analyzing pixel color values expressed in a luminance-chrominance format YCrCb (where Y is a value representing luminance of a pixel color, Cr is a value representing red chrominance of a pixel color, Cb is a value representing blue chrominance of a pixel color), said tables including (a1) a first lookup table containing a plurality of pixel luminance profiles stored at locations accessible by a first index containing a Y value concatenated with an AVG_Y value wherein AVG_Y is an average of Y values in a block, each luminance profile containing a homogenous bit that is set to a not-homogenous state when (Y−AVG_Y) exceeds a predetermined homogenous threshold and is set to a homogenous state when (Y−AVG_Y) is equal to or less than said homogenous threshold, (a2) a second lookup table containing a plurality of threshold indicators stored at locations accessible by an index including a current AVG_YCrCb value concatenated with an AVG_YCrCb_AT_LAST_UPDATE value for a block, each threshold indicator being set to a first state when (AVG YCrCb−AVG_YCrCb_AT_LAST_UPDATE) exceeds a predetermined threshold and to a second state when (AVG_YCrCb−AVG_YCrCb_AT_LAST_UPDATE) does not exceed such threshold, and (a3) a third table containing a plurality of AVG_YCrCb_AT_UPDATE values stored at locations accessible by a third index including a block number identifying location of a block in a frame, each AVG_y_AT_LAST_UPDATE value being a AVG_Y value when a block was last charged;

(b) an uncompressed frame from said source stored in said main memory, said uncompressed frame having a predetermined number of groups of blocks of pixel values, each group containing a predetermined number of blocks, each block containing a predetermined number of pixel values;

(c) means for defining each pixel value by a YCrCb value:

(d means for operating said microprocessor to process a group, one block at a time and create an output entry for a group being processed, wherein said output entry comprises a header for a group being processed, said header having a plurality of bit fields for each block in said group being processed which bit fields indicate block status as being unchanged, changed-homogenous, and changed-not-homogenous, said means (d) comprising (d1) means for determining average YCrCb values AVG Y, AVG Cr and AVG Cb from all pixel values in a block, (d2) means for creating a block luminance profile by reading from said first lookup table a plurality of pixel luminance profiles for each pixel in a block, each pixel luminance profile being read using a first index comprising Y for such pixel and AVG Y of its block, (d3) means for reading from said third lookup table an AVG_YCrCb_AT_LAST_UPDATE value for said block being processed, (d4) means for reading a threshold indicator from said second lookup table using a second index of said AVG_YCrCb_AT_LAST_UPDATE value from means (d3) concatenated with current AVG_YCrCb for said block being processed, (d5) means for examining, when said threshold indicator read in means (d4) is in said second state thereof, whether any pixel luminance profile in said block luminance profile is set to a not-homogenous state, and placing a plurality of pixel color values in said output entry when a pixel luminance profile is set to a not-homogenous state or placing a single pixel color value when all of said pixel profile values are set to homogenous states;

(d6) means for setting said block group header to indicate said block being processed has a homogenous status or a not-homogenous status in accordance with examining results of means (d5), (d7) means for updating said third table with current AVG_YCrCb and returning to means (d1) to process a next block, (d8) means for setting said block group header to indicate said block being processed has an unchanged status, and returning to means (d1) to process a next block, when said threshold indicator read in means (d4) is in said first state thereof, and (d9) means for transmitting to said recording means a single pixel color value for a homogenous block and a plurality of pixel color values for a not-homogenous block; and (e) means for transmitting output entrees from said groups in a frame to said recording device for recording said output entries as a compressed frame.

4. A personal computer system in accordance with claim 3 comprising:

contrast bits stored in each of said pixel luminance profiles in said first lookup table, said contrast bits in each pixel luminance profile indicating if Y−AVG_Y) exceeds a predetermined contrast threshold;

a fourth lookup table in said main memory which contains contrast bits for pixels in a block at the last update thereof;

and, means for reading said contrast bits at last update from said fourth lookup table, comparing such contrast bits with contrast bits in said luminance profiles from means (d2), and operating means (d5) when said comparison indicates inequality, and operating means (d8) when said comparison indicates equality.

* * * * *

UNITED STATES PATENT AND TRADEMARK OFFICE
CERTIFICATE OF CORRECTION

PATENT NO. : 5,319,793
DATED : June 7, 1994
INVENTOR(S) : Steven M. Hancock; Mark A. Pietras; Arturo A. Rodriguez It is certified that error appears in the above-identified patent and that said Letters Patent is hereby corrected as shown below:

```
Column 13
In Claim 3, (a3), lines 1-2: correct "AVG_YCrCb_AT_UPDATE"
    to read --AVG_YCrCb_AT_LAST_UPDATE--.
Column 13
In Claim 3, (a3), line 5: correct "AVG_y_AT_LAST_UPDATE to
    read --AVG_Y_AT_LAST_UPDATE--.
```

Signed and Sealed this

Twenty-fifth Day of November, 1997

Attest:

Attesting Officer

BRUCE LEHMAN

Commissioner of Patents and Trademarks